(12) United States Patent
Miyamoto et al.

(10) Patent No.: US 11,071,942 B2
(45) Date of Patent: Jul. 27, 2021

(54) RECLAIMING APPARATUS AND METHOD, AND CO2 RECOVERY APPARATUS AND METHOD

(71) Applicant: Mitsubishi Heavy Industries Engineering, Ltd., Kanagawa (JP)

(72) Inventors: Osamu Miyamoto, Houston, TX (US); Takashi Kamijo, Kanagawa (JP); Tatsuya Tsujiuchi, Tokyo (JP)

(73) Assignee: Mitsubishi Heavy Industries Engineering, Ltd., Kanagawa (JP)

( * ) Notice: Subject to any disclaimer, the term of this patent is extended or adjusted under 35 U.S.C. 154(b) by 336 days.

(21) Appl. No.: 16/156,080

(22) Filed: Oct. 10, 2018

(65) Prior Publication Data
US 2020/0114302 A1   Apr. 16, 2020

(51) Int. Cl.
*B01D 53/14*   (2006.01)
*B01B 1/06*   (2006.01)
*C01B 32/50*   (2017.01)
*B01D 53/18*   (2006.01)

(52) U.S. Cl.
CPC ............ *B01D 53/1418* (2013.01); *B01B 1/06* (2013.01); *B01D 53/1425* (2013.01); *B01D 53/1475* (2013.01); *B01D 53/18* (2013.01); *C01B 32/50* (2017.08)

(58) Field of Classification Search
CPC ............ B01D 53/1418; B01D 53/1425; B01D 53/1475; B01D 53/18; B01D 53/62; B01D 53/78; B01D 2257/504; B01D 2258/0283; C01B 32/50; Y02C 20/40; B01B 1/06
See application file for complete search history.

(56) References Cited

U.S. PATENT DOCUMENTS

| | | | |
|---|---|---|---|
| 5,993,608 A | 11/1999 | Abry et al. | |
| 7,438,129 B2 * | 10/2008 | Heins | C02F 1/04 166/266 |
| 8,927,450 B2 * | 1/2015 | Iijima | B01D 53/1425 502/55 |

(Continued)

FOREIGN PATENT DOCUMENTS

| | | | |
|---|---|---|---|
| CN | 203833654 U | * 9/2014 | .......... Y02A 20/124 |
| JP | 2011-104580 A | 6/2011 | |

(Continued)

OTHER PUBLICATIONS

WO2009154331A1_Eng (Espacenet machine translation of Kim) (Year: 2009).*

(Continued)

*Primary Examiner* — Jonathan Miller
*Assistant Examiner* — Gabriel E Gitman
(74) *Attorney, Agent, or Firm* — Osha Bergman Watanabe & Burton LLP (57) ABSTRACT

A reclaiming apparatus includes: a container in which a reclaiming process of an absorption liquid is performed; an absorption liquid supply line for supplying the container with the absorption liquid; a heat exchange device, installed inside the container, for heating a liquid inside the container; a circulation line for extracting the liquid inside the container, circulating the liquid and returning the liquid to the container; and a circulation pump installed in the circulation line.

13 Claims, 6 Drawing Sheets

(56) References Cited

U.S. PATENT DOCUMENTS

| | | | |
|---|---|---|---|
| 2011/0092355 A1* | 4/2011 | Iijima | B01D 53/1425 502/55 |
| 2016/0361682 A1* | 12/2016 | Yukumoto | B01D 53/1425 |
| 2016/0375398 A1* | 12/2016 | Hagimoto | B01J 49/00 95/179 |
| 2019/0030480 A1* | 1/2019 | Tanaka | B01D 53/52 |

FOREIGN PATENT DOCUMENTS

| | | | | |
|---|---|---|---|---|
| JP | 4875522 B2 | 2/2012 | | |
| JP | WO2017122443 A1 * | 7/2017 | | B01D 53/14 |
| WO | WO2009154331 A1 * | 12/2009 | | B01D 53/1425 |
| WO | 2017-122443 A1 | 7/2017 | | |

OTHER PUBLICATIONS

WO2017122443A1_Eng (Espacenet machine translation of Tanaka) (Year: 2017).*
CN203833654U_Eng (Espacenet machine translation of Chen) (Year: 2014).*

\* cited by examiner

RECLAIMING APPARATUS AND METHOD, AND CO2 RECOVERY APPARATUS AND METHOD

TECHNICAL FIELD

The present disclosure relates to a reclaiming apparatus, a reclaiming method, a $CO_2$ recovery apparatus, and a $CO_2$ recovery method.

BACKGROUND ART

As a method of recovering $CO_2$ contained in exhaust gas from a power generation facility or the like, a chemical absorption method is often used.

In a chemical absorption method, exhaust gas containing $CO_2$ and an absorption liquid containing an absorption agent make contact, and the absorption liquid absorbs $CO_2$ in the exhaust gas. Accordingly, $CO_2$ is removed from exhaust gas. The absorption liquid having absorbed $CO_2$ releases the absorbed $CO_2$ to be regenerated, by being heated by steam or the like, and is re-utilized as an absorption liquid. As the absorption liquid is re-utilized repeatedly, impurity substances from exhaust gas and depleted materials from the absorption liquid accumulate in the absorption liquid. Reclaiming is performed to remove such depleted materials or the like accumulating in the absorption liquid from the absorption liquid.

Reclaiming includes supplying a container with water and an absorption liquid which has released $CO_2$, and heating the liquid (absorption liquid and water) inside the container, thereby recovering the evaporated absorption liquid and separating condensed depleted materials in the absorption liquid from the absorption liquid.

Further, in reclaiming, a kettle-type heat exchanger including a heat exchange device (heat-transfer tube or the like) inside a container (container called shell, for instance) may be used. In a case where reclaiming is performed by a heat exchanger, by flowing a heating fluid through a heat exchange device, a fluid inside a container is heated and boiled through heat exchange with a heating fluid at the heat exchange device. The container of the heat exchanger is greater than a heat exchange device (heat-transfer tube or the like), and inside the container, gas and liquid are separated in the upper space of the heat exchange device.

Herein, during execution of reclaiming, non-volatile materials such as depleted substances inside the container become condensed. Thus, during the process of condensation, the moisture concentration in the liquid becomes relatively low, and the viscosity of the fluid increases, which makes it difficult for natural convection to occur. When convection reduces, distribution of the concentration and the temperature in the liquid inside the container is more likely to become uneven, generating a high-temperature section and a non-volatile-material concentrated section partially in the liquid, which may cause bumping. Furthermore, in a case where the above described kettle-type heat exchanger is used, boiling occurs outside the heat exchange device (heat-transfer tube or the like), whereby the heat exchange device physically prevents convection, and thereby bumping is even more likely to occur.

Although not directly related to bumping prevention in reclaiming, as a measure to suppress foaming in reclaiming, Patent Document 1 discloses spraying a de-foaming agent toward the boundary between a gas-phase part of a gas-liquid separating device (reclaiming apparatus) and a liquid-phase part including an absorption liquid, from the gas-phase part.

CITATION LIST

Patent Literature

Patent Document 1: U.S. Pat. No. 5,993,608B

SUMMARY

However, Patent Document 1 does not disclose any specific measure for suppressing bumping which may occur in reclaiming.

In view of the above, an object of at least one embodiment of the present invention is to provide a reclaiming apparatus and a reclaiming method, and a $CO_2$ recovery apparatus and a $CO_2$ recovery method capable of suppressing bumping in reclaiming.

(1) A reclaiming apparatus includes: a container in which a reclaiming process of an absorption liquid is performed; an absorption liquid supply line for supplying the container with the absorption liquid; a heat exchange device, installed inside the container, for heating a liquid inside the container; a circulation line for extracting the liquid inside the container, circulating the liquid and returning the liquid to the container; and a circulation pump installed in the circulation line.

As described above, when the non-volatile material such as depleted materials condensate inside the container as reclaiming proceeds, bumping may occur in the container.

In this regard, with the above configuration (1), the liquid inside the container is extracted via the circulation line, and the liquid is circulated to return to the container. Thus, it is possible to suppress bumping that may occur inside the container.

(2) In some embodiments, in the above configuration (1), the absorption liquid supply line is connected to the circulation line and configured to supply the circulation line with the absorption liquid.

With the above configuration (2), the absorption liquid from the absorption liquid supply line is supplied to the container via the circulation line. Thus, in the circulation line, it is possible to introduce the absorption liquid into the container in a state where the liquid extracted from the container and the absorption liquid from the absorption liquid supply line are sufficiently mixed. Accordingly, it is possible to suppress uneven distribution of the concentration of the liquid inside the container, and suppress bumping inside the container effectively.

(3) In some embodiments, in the above configuration (1) or (2), the circulation line includes a first end connected to a bottom part of the container, and is configured to extract the liquid from the container via the first end.

In a case where convection of the liquid reduces in the container, the temperature of the solvent is likely to decrease at the bottom part of the container, and the concentration of the non-volatile material is likely to increase.

In this regard, with the above configuration (3), the liquid is extracted from the bottom part of the container where the temperature of the solvent is likely to decrease and the concentration of the non-volatile concentration is likely to increase, and the liquid is circulated through the circulation line. Thus, it is possible to reduce uneven distribution of the concentration and the temperature in the liquid inside the container, and suppress bumping inside the container effectively.

(4) In some embodiments, in any of the above configurations (1) to (3), the circulation line includes a second end connected to the container, and is configured to return the liquid to the container via the second end, and the second end is connected to a gas-phase part of the container.

With the above configuration (4), the liquid extracted from the container is returned to the position of the gas-phase part inside the container, and thus the liquid returned to the gas-phase part positioned above the liquid-phase part flows into the liquid-phase part from above. Thus, mixing of the liquid returned into the container from the circulation line and the liquid inside the container is promoted. Thus, uneven distribution of the temperature and the concentration in the liquid in the container is effectively reduced, and it is possible to suppress bumping inside the container effectively.

Further, the gas-phase part may be formed above the heat exchange device inside the container.

(5) In some embodiments, in any one of the above configurations (1) to (4), the circulation line includes a second end connected to the container, and is configured to return the liquid to the container via the second end, and the second end is connected to a liquid-phase part inside the container above the bottom of the heat exchange device.

With the above configuration (5), the liquid extracted from the container is returned to the relatively-high position of the liquid-phase part that is above the lowest position of the heat exchange device, and thus mixing between the liquid returned to the liquid-phase part and the liquid inside the container is promoted. Thus, uneven distribution of the temperature and the concentration in the liquid in the container is effectively reduced, and it is possible to suppress bumping inside the container effectively.

(6) In some embodiments, in any one of the above configurations (1) to (5), the reclaiming apparatus includes: a waste-liquid recovery tank for storing a waste liquid from the container; a waste liquid line installed between the container and the waste-liquid recovery tank; and a waste liquid pump, installed in the waste liquid line, for sending the waste liquid from the container to the waste-liquid recovery tank. The circulation line is formed to pass through the waste liquid pump, and the waste liquid pump is configured to function as the circulation pump.

With the above configuration (6), the waste liquid pump for sending a waste liquid to the waste-liquid recovery tank is utilized as a circulation pump, and thus it is possible to suppress bumping in reclaiming while suppressing an increase in the installation cost.

(7) In some embodiments, in any one of the above configurations (1) to (6), the reclaiming apparatus further includes a bumping suppressing agent supply part for adding a bumping suppressing agent to the absorption liquid supply line or the circulation line.

With the above configuration (7), a foaming suppressing agent is added to the absorption liquid supply line or the circulation line, and thus it is possible to mix a bumping suppressing agent in advance into the absorption liquid or the liquid before being supplied to the container, via the absorption liquid supply line or the circulation line. Thus, it is possible to suppress bumping inside the container effectively.

(8) In some embodiments, in the above configuration (7), the bumping suppressing agent contains a rich liquid having a higher concentration of an absorption target material than the absorption liquid.

When a rich liquid having a high concentration of absorption target material (e.g. $CO_2$) is supplied to the liquid inside the container, a gas being an absorption target material may be produced in the container. In this case, the gas forms bubble nuclei, which promotes smooth boiling of the solvent in the container.

Thus, with the above configuration (8), a rich liquid having a higher concentration of the absorption target material than the absorption liquid supplied to the container is supplied as a bumping suppressing agent. Thus, bubble nuclei of the absorption target material are formed in the liquid inside the container, which makes it possible to suppress bumping in reclaiming effectively.

(9) According to at least one embodiment of the present invention, a reclaiming apparatus includes: a container in which a reclaiming process of an absorption liquid is performed; an absorption liquid supply line for supplying the container with the absorption liquid; a heat exchange device, installed inside the container, for heating a liquid inside the container which contains the absorption liquid; and a bumping suppressing agent supply part for adding a bumping suppressing agent into the container from a bottom part of the container.

With the above configuration (9), the bumping suppressing agent is added into the container from the bottom part of the container, and thus it is possible to suppress bumping inside the container effectively. For instance, by using a gas capable of forming bubble nuclei in the liquid inside the container, smooth boiling of the solvent is promoted inside the container, through formation of bubble nuclei in the liquid. Accordingly, it is possible to suppress bumping in reclaiming effectively.

(10) According to at least one embodiment of the present invention, a $CO_2$ recovery apparatus includes: an absorption tower configured to cause an absorption liquid containing an absorption agent to absorb $CO_2$ in exhaust gas; a regeneration tower for regenerating the absorption liquid from the absorption tower; and the reclaiming apparatus according to any one of the above (1) to (9). The $CO_2$ recovery apparatus is configured such that at least a part of the absorption liquid stored in the regeneration tower is supplied to the container via the absorption liquid supply line.

With the above configuration (10), in reclaiming of the absorption liquid from the absorption tower from the $CO_2$ recovery apparatus, the liquid inside the container is extracted via the circulation line, and the liquid is circulated to return to the container. Thus, it is possible to suppress bumping that may occur inside the container during reclaiming.

(11) In some embodiments, in the above configuration (10), the reclaiming apparatus includes a bumping suppressing agent supply part for adding a bumping suppressing agent to the absorption liquid supply line or the circulation line. The bumping suppressing agent is a rich liquid having a higher concentration of an absorption target material than the absorption liquid. The $CO_2$ recovery apparatus is configured such that at least a part of a $CO_2$ lean liquid stored in the regeneration tower is supplied to absorption liquid supply line as the absorption liquid. The $CO_2$ recovery apparatus is configured such that at least a part of a $CO_2$ rich liquid stored in the absorption tower is supplied to the bumping suppressing agent supply part as the bumping suppressing agent.

With the above configuration (11), in a $CO_2$ recovery apparatus in which at least a part of the $CO_2$ lean liquid stored in the regeneration tower is supplied to the absorption liquid supply line as the absorption liquid, at least a part of the $CO_2$ rich liquid stored in the absorption tower is used as a bumping suppressing agent, and thus it is possible to suppress bumping inside the container efficiently.

(12) According to at least one embodiment of the present invention, a reclaiming method includes: a step of supplying a container including a heat exchange device inside with an absorption liquid via an absorption liquid supply line; a step of performing a reclaiming process by heating a liquid inside the container containing the absorption liquid with the heat exchange device; a step of extracting the liquid inside the container to a circulation line; and a step of returning the liquid extracted to the circulation line to the container, by circulating the liquid with a circulation pump installed in the circulation line.

According to the above method (12), the liquid inside the container is extracted via the circulation line, and the liquid is circulated to return to the container. Thus, it is possible to suppress bumping that may occur inside the container during reclaiming.

(13) In some embodiments, in the above method (12), the absorption liquid supply line is connected to the circulation line, and the step of supplying the absorption liquid includes supplying the container with the absorption liquid via the circulation line.

According to the above method (13), the absorption liquid from the absorption liquid supply line is supplied to the container via the circulation line. Thus, in the circulation line, it is possible to introduce the absorption liquid into the container in a state where the liquid extracted from the container and the absorption liquid from the absorption liquid supply line are sufficiently mixed. Accordingly, it is possible to suppress uneven distribution of the concentration of the liquid inside the container, and suppress bumping inside the container effectively.

(14) In some embodiments, in the above method (12) or (13), the reclaiming method further includes a step of adding a bumping suppressing agent to the absorption agent supply line or the circulation line.

According to the above method (14), a bumping suppressing agent is added to the absorption liquid supply line or the circulation line, and thus it is possible to mix a bumping suppressing agent in advance into the absorption liquid and the liquid before being supplied to the container, via the absorption liquid supply line or the circulation line. Thus, it is possible to suppress bumping inside the container effectively.

(15) According to at least one embodiment of the present invention, a $CO_2$ recovery method includes: a step of causing an absorption liquid containing an absorption agent to absorb $CO_2$ in exhaust gas, in an absorption tower; a step of supplying the absorption liquid from the absorption tower to a regeneration tower, and regenerating the absorption liquid in the regeneration tower; and a step of performing the reclaiming method according to any one of the above (12) to (14). The step of supplying the container with the absorption liquid includes supplying the container with at least a part of the absorption liquid stored in the regeneration tower.

According to the above method (15), in reclaiming of the absorption liquid from the absorption tower, the liquid inside the container is extracted via the circulation line, and the liquid is circulated to return to the container. Thus, it is possible to suppress bumping that may occur inside the container during reclaiming.

According to at least one embodiment of the present invention, provided is a reclaiming apparatus and a reclaiming method, and a $CO_2$ recovery apparatus and a $CO_2$ recovery method capable of suppressing bumping in reclaiming.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

In the following description, a $CO_2$ absorption liquid containing a $CO_2$ absorption agent is reclaimed by a reclaiming apparatus. Nevertheless, the absorption agent and the absorption liquid according to the present invention is not limited to this. For instance, the absorption agent may be a $H_2S$ absorption agent that absorbs $H_2S$, and the absorption liquid may be a $H_2S$ absorption liquid that contains a $H_2S$ absorption agent. Further, in the following description, the $CO_2$ absorption agent and the $CO_2$ absorption liquid may be referred to as merely an absorption agent and an absorption liquid, respectively.

First, the overall configuration of a $CO_2$ recovery apparatus will be described, to which a reclaiming apparatus according to an embodiment is applied.

Figure 1:
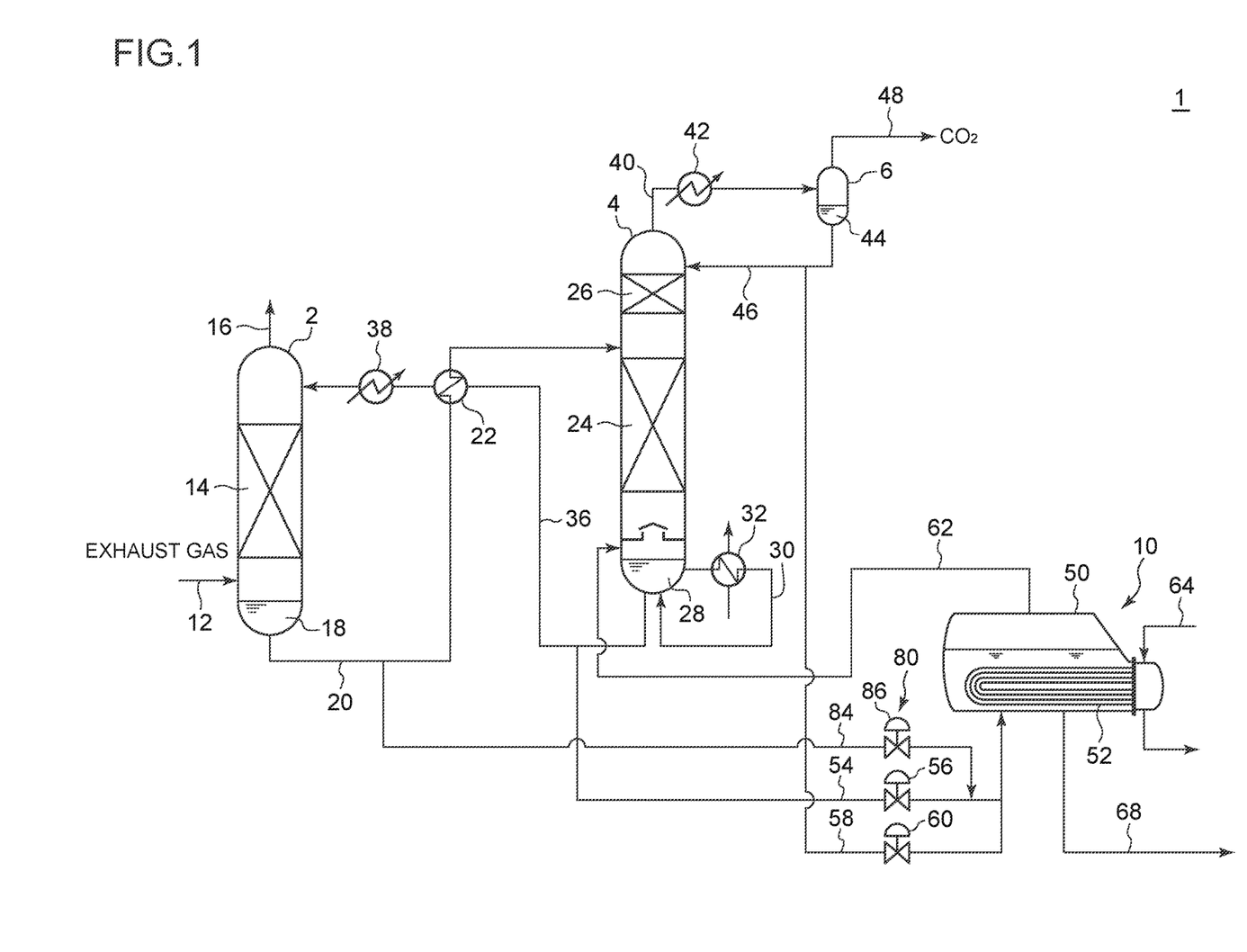
FIG. 1 is a schematic diagram of a $CO_2$ recovery apparatus to which a reclaiming apparatus according to an embodiment is applied.

FIG. 1 is a schematic diagram of a $CO_2$ recovery apparatus to which a reclaiming apparatus according to an embodiment is applied. FIGS. 2 to 6 are each a schematic diagram of a reclaiming apparatus according to an embodiment.

The $CO_2$ recovery apparatus shown in FIG. 1 is an apparatus for recovering $CO_2$ from exhaust gas discharged from a power generation facility or a factory, for instance. As depicted in the drawings, the $CO_2$ recovery apparatus 1 includes an absorption tower 2 for causing an absorption liquid to absorb $CO_2$ in exhaust gas from a power generation facility or the like, a regeneration tower 4 for regenerating the absorption liquid having absorbed $CO_2$, a reflux water drum 6 configured to separate the released gas from the regeneration tower 4 into $CO_2$ gas and condensed water, and return the condensed water to the regeneration tower 4, and a reclaiming apparatus 10 for reclaiming the absorption liquid.

Exhaust gas containing $CO_2$ is supplied to the absorption tower 2 via an exhaust gas introduction line 12. Further, a pretreatment device for pre-processing exhaust gas (desulfurization, cooling, etc.) may be installed at the upstream of the absorption tower 2, and the absorption tower 2 may be supplied with exhaust gas after treated with such pretreatment.

The absorption tower 2 includes an absorption part 14 formed by a packed layer, for instance, and the absorption part 14 is supplied with a $CO_2$ absorption liquid containing a $CO_2$ absorption agent from above.

The exhaust gas having flown into the absorption tower 2 via the exhaust gas introduction line 12 flows upward through the absorption tower 2 from the side of the tower bottom part of the absorption tower 2, and flows into the absorption part 14. Further, in the absorption part 14, exhaust gas makes counter-current contact with the $CO_2$ absorption liquid supplied from the upper part of the absorption part 14, and thereby $CO_2$ in exhaust gas is absorbed by the $CO_2$ absorption liquid.

The $CO_2$ absorption liquid may be an aqueous solution of the $CO_2$ absorption agent.

The type of the $CO_2$ absorption agent is not particularly limited. For instance, alkanolamines such as monoethanolamine and diethanolamine, or a basic material other than amines such as sodium hydroxide, potassium hydroxide and calcium hydroxide can be used as the $CO_2$ absorption agent.

Exhaust gas deprived of $CO_2$ gas through contact with the $CO_2$ absorption liquid in the absorption part 14 is discharged outside from the tower top part 16 of the absorption tower 2.

On the other hand, the $CO_2$ absorption liquid having absorbed the $CO_2$ gas in the exhaust gas in the absorption part 14 falls onto the tower bottom part of the absorption tower, and is stored in the tower bottom part. The $CO_2$ absorption liquid stored in the tower bottom part of the absorption tower 2 is a rich absorption liquid 18 ($CO_2$ rich liquid) having a higher $CO_2$ concentration than the $CO_2$ absorption liquid described below stored in the tower bottom part of the regeneration tower 4. The rich absorption liquid 18 is supplied to the regeneration tower 4 from the absorption tower 2 via a rich liquid line 20 by a pump (not depicted) installed in the rich liquid line 20.

Further, as depicted in FIG. 1, a heat exchanger 22 for exchanging heat between the rich absorption liquid flowing through the rich liquid line 20 and the lean absorption liquid ($CO_2$ lean liquid) flowing through the lean liquid line 36 may be installed in the rich liquid line 20. By heating the rich absorption liquid through heat exchange with the lean absorption liquid having a relatively high temperature, it is possible to promote regeneration of the absorption liquid in the regeneration tower 4 described below.

The regeneration tower 4 includes a release part 24 that releases $CO_2$ gas from the rich absorption liquid and a first cleaning device 26 which cleans the $CO_2$ gas released at the release part 24 with reflux water.

The release part 24 includes a packing material, and is supplied with the rich absorption liquid from above through the rich liquid line 20. The rich absorption liquid is heated by the steam described below, in the release part 24, releases $CO_2$ gas, and becomes a lean absorption liquid which contains a relatively low rate of $CO_2$.

The lean absorption liquid having released $CO_2$ gas at the release part 24 descends from the regeneration tower 4, and is stored in the tower bottom part of the regeneration tower 4. The lean absorption liquid 28 is supplied, via a re-boiler line 30, to a regeneration heater (re-boiler) 32 installed in the re-boiler line 30. In the regeneration heater 32, the lean absorption liquid 28 exchanges heat with a heating medium (e.g. Water steam), whereby at least a part of the lean absorption liquid 28 changes in phase to saturated steam, and is supplied to the tower bottom part of the regeneration tower 4. The saturated steam produced by the regeneration heater 32 as described above flows upward through the regeneration tower 4 toward the release part 24, and is used as a heating source for heating the rich absorption liquid at the release part 24.

The lean absorption liquid (containing a lean absorption liquid that has not changed its phase in the regeneration heater 32) stored in the tower bottom part of the regeneration tower 4 is taken out from the tower bottom part of the regeneration tower 4, and is supplied to the absorption part 14 of the absorption tower 2 via the lean liquid line 36 by a feeding pump (not depicted) installed in the lean liquid line 36, thereby being re-utilized as the above described $CO_2$ absorption liquid. Further, a cooler 38 for cooling the lean absorption liquid may be installed in the lean liquid line 36.

The $CO_2$ gas released from the rich absorption liquid at the release part 24 flows upward toward the cleaning device 26 installed above the release part 24 in the regeneration tower 4. The cleaning device 26 removes the absorption agent remaining in the $CO_2$ gas as the $CO_2$ gas from the release part 24 makes gas-liquid contact with the cleaning liquid supplied from above the cleaning device 26.

The cleaning device 26 is not particularly limited as long as it is capable of promoting gas-liquid contact between $CO_2$ gas and the first cleaning liquid. For instance, the cleaning device 26 may include one or more stages of trays or a packed layer.

The $CO_2$ gas after passing through the cleaning device 26 is released from the tower top part of the regeneration tower 4, and is supplied to the $CO_2$ gas line 40. A condenser 42 is installed in the $CO_2$ gas line 40, and in the condenser 42, $CO_2$ gas is cooled and steam in the $CO_2$ gas is condensed. The $CO_2$ gas after passing through the condenser 42 is supplied to the reflux water drum 6 installed on the outlet side of the $CO_2$ gas line 40.

The reflux water drum 6 is configured to separate released gas from the regeneration tower 4 ($CO_2$-containing gas) into $CO_2$ gas and condensed water.

The condensed water 44 separated by the reflux water drum 6 is stored in the tower bottom part of the reflux water drum 6. The condensed water 44 is supplied to the cleaning device 26 of the regeneration tower 4 as a cleaning liquid, via the reflux water line 46. Further, the condensed water 44 is supplied to the reclaiming apparatus 10, via the water supply line 58.

On the other hand, $CO_2$ gas separated by the reflux water drum 6 is released from the reflux water drum 6 via a recovery line 48 connected to the tower top part of the reflux water drum 6, compressed by a compressor (not depicted) installed in the recovery line 48, and is taken out of the system as product $CO_2$, for instance.

The reclaiming apparatus 10 is configured to remove non-volatile components from a $CO_2$ absorption liquid, which includes non-volatile components such as impure substances from exhaust gas and depleted substances of the absorption liquid accumulating due to repetitive re-utilization of the absorption liquid in the $CO_2$ recovery apparatus 1, and recover the $CO_2$ absorption agent and return the $CO_2$ absorption agent to the $CO_2$ recovery apparatus 1.

As depicted in FIGS. 2 to 6, the reclaiming apparatus 10 includes a container 50 for storing an absorption liquid and water (container for reclaiming), an absorption liquid supply line 54 for supplying the container 50 with an absorption liquid, a water supply line 58 for supplying water to the container 50, a steam discharge line 62 for discharging steam from the container 50, and a heating device 52 (heat exchange device) for heating a liquid containing water and an absorption liquid.

Further, an absorption liquid valve 56 for adjusting the supply amount of absorption liquid to the container 50 is installed in the absorption liquid supply line 54, and a water valve 60 for adjusting the supply amount of water to the container 50 is installed in the water supply line 58.

In some embodiments, the heating device 52 may be configured to heat a liquid inside the container through heat exchange between the liquid inside the container and a heating medium.

For instance, as depicted in FIG. 1, the heating device 52 includes a U-shaped heat-transfer tube installed inside the container 50. The heating device 52 may be configured to heat the liquid inside the container through heat exchange with a heating medium supplied via a heating medium line 64. The heating medium supplied to the heating device 52 may be water vapor or oil, for instance.

Alternatively, in some embodiments, the heating device 52 may be configured to heat a liquid inside the container 50 by electricity.

In some embodiments, as depicted in FIG. 1, a lean absorption liquid ($CO_2$ lean liquid) from the lean liquid line 36 may be supplied to the absorption liquid supply line 54. In the embodiment depicted in FIG. 1, the lean absorption liquid is supplied to the absorption liquid supply line 54 from the lean liquid line 36 upstream of the heat exchanger 22. Nevertheless, in another embodiment, the lean absorption liquid may be supplied to the absorption liquid supply line 54 from the lean liquid line 36 downstream of the heat exchanger 22.

Further, in some embodiments, as depicted in FIG. 1, a part of the condensed water 44 stored in the reflux water drum 6 may be supplied to the water supply line 58. Further, water supplied to the container 50 is not limited to the condensed water from the reflux water drum 6. The container 50 may be supplied with water from another supply source, instead of, or in addition to, the condensed water from the reflux water drum 6.

Further, in some embodiments, as depicted in FIG. 1 for instance, the outlet of the steam discharge line 62 may be connected to the regeneration tower 4. That is, steam discharged from the container 50 may be supplied to the regeneration tower 4.

As depicted in FIGS. 2 to 6, the reclaiming apparatus 10 according to some embodiments includes the above described container 50, a waste-liquid recovery tank 78 for storing a waste liquid from the container 50, a waste liquid line 68 installed between the container 50 and the waste-liquid recovery tank 78, and a waste liquid cooler 72 installed in the waste liquid line 68.

A waste liquid pump 74 for pumping a waste liquid from the container 50 toward the waste-liquid recovery tank 78 is installed in the waste liquid line 68. A waste liquid valve 70 is installed in the waste liquid line 68.

The waste liquid cooler 72 is configured to cool the waste liquid from the container 50. The waste liquid cooler 72 may be configured to be supplied with a cooling medium, for instance, and cool the waste liquid through heat exchange with the cooling medium.

A procedure of reclaiming the absorption liquid by using the above described reclaiming apparatus 10 is as follows.

First, by opening the absorption liquid valve 56 and the water valve 60 to supply the container 50 with the absorption liquid and water, and heating the liquid inside the container with the heating device 52, the volatile components (water and absorption agent) in the liquid are evaporated, and the non-volatile components (depleted materials of the absorption liquid) are condensed in the liquid inside the container 50, and thereby the absorption agent in the container is separated from the non-volatile components (absorption liquid regeneration step).

Steam containing the absorption agent produced from heating is discharged from the container 50 via the steam discharge line 62, and returned to the regeneration tower 4 of the $CO_2$ recovery apparatus 1. The absorption agent returned to the regeneration tower 4 is used again as an absorption liquid that absorbs $CO_2$ in the $CO_2$ recovery apparatus 1.

Once the non-volatile components are sufficiently concentrated in the container 50 (i.e., the concentration of the non-volatile components in the liquid inside the container 50 increases sufficiently), the absorption liquid valve 56 is closed, and supply of the absorption liquid to the container 50 is stopped.

Next, by supplying the container 50 with water (condensed water from the reflux water drum 6, or the like) via the water supply line 58 and heating the liquid with the heating device 52 in a state where supply of the absorption liquid to the container 50 is shut off, the absorption agent remaining in the liquid is evaporated together with water. The steam containing the absorption agent produced in the container 50 from heating is discharged from the container 50 via the steam discharge line 62 (absorption liquid recovery step).

Once the concentration of the absorption agent in the liquid inside the container 50 decreases sufficiently, the water valve 60 is closed and supply of water to the container 50 is stopped, and heating of the liquid by the heating device 52 is stopped.

Further, sludge inside the container 50 is discharged as a waste liquid, to the outside of the container 50, via the waste liquid line 68 (discharge step). More specifically, the waste liquid valve 70 installed in the waste liquid line 68 is opened, and the waste liquid pump 74 is started. Accordingly, the waste liquid containing reclaiming sludge remaining in the container 50 after completion of the above described absorption liquid recovery step is discharged from the container 50, and is sent to the waste-liquid recovery tank 78 via the waste liquid line 68.

Further, the waste liquid discharged from the container 50 may be cooled by the waste liquid cooler 72 installed in the waste liquid line 68, and then sent to the waste-liquid recovery tank 78.

Hereinafter, a reclaiming apparatus 10 according to some embodiments will be described in more detail.

Figure 2:
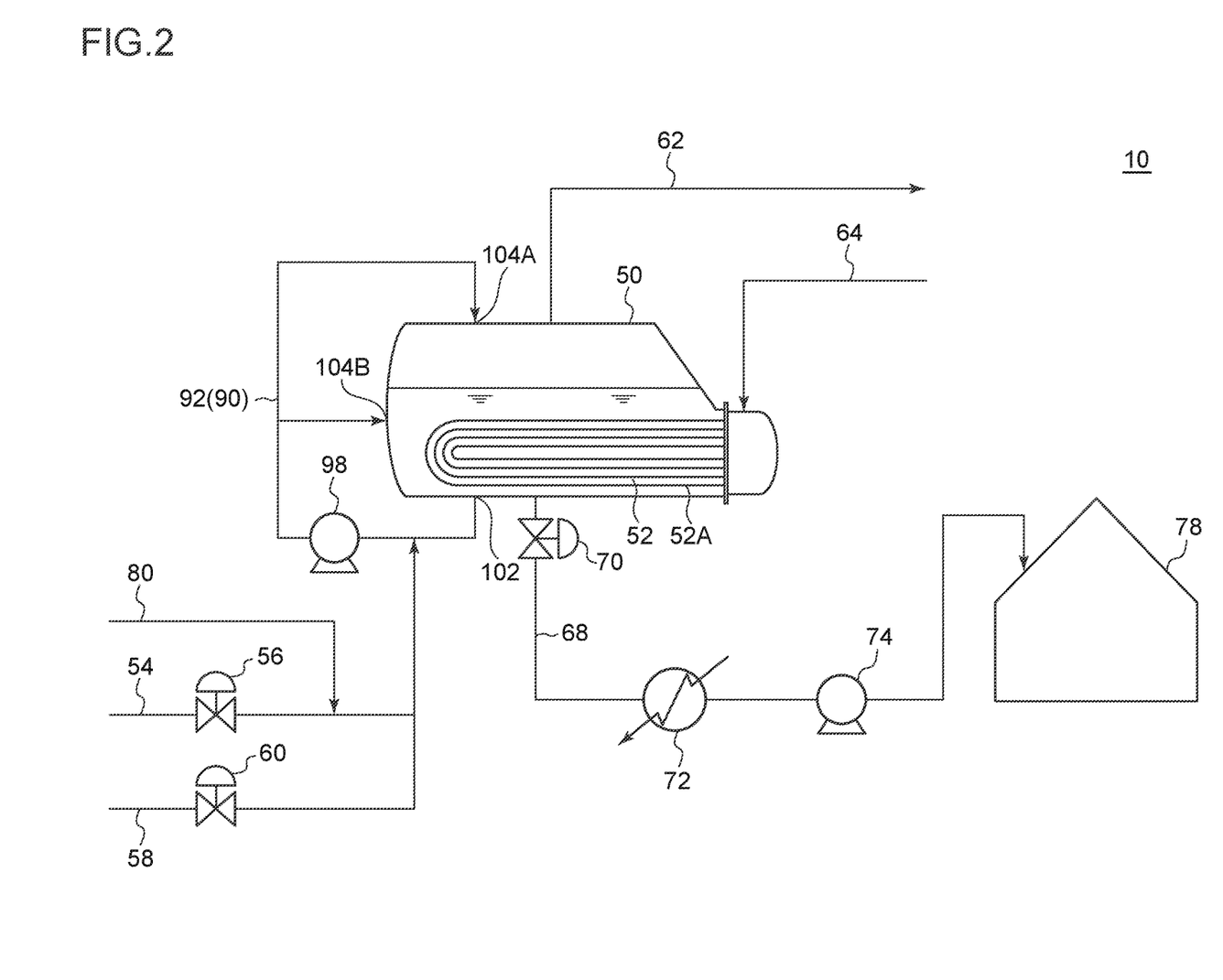
FIG. 2 is a schematic diagram of a reclaiming according to an embodiment.
Figure 3:
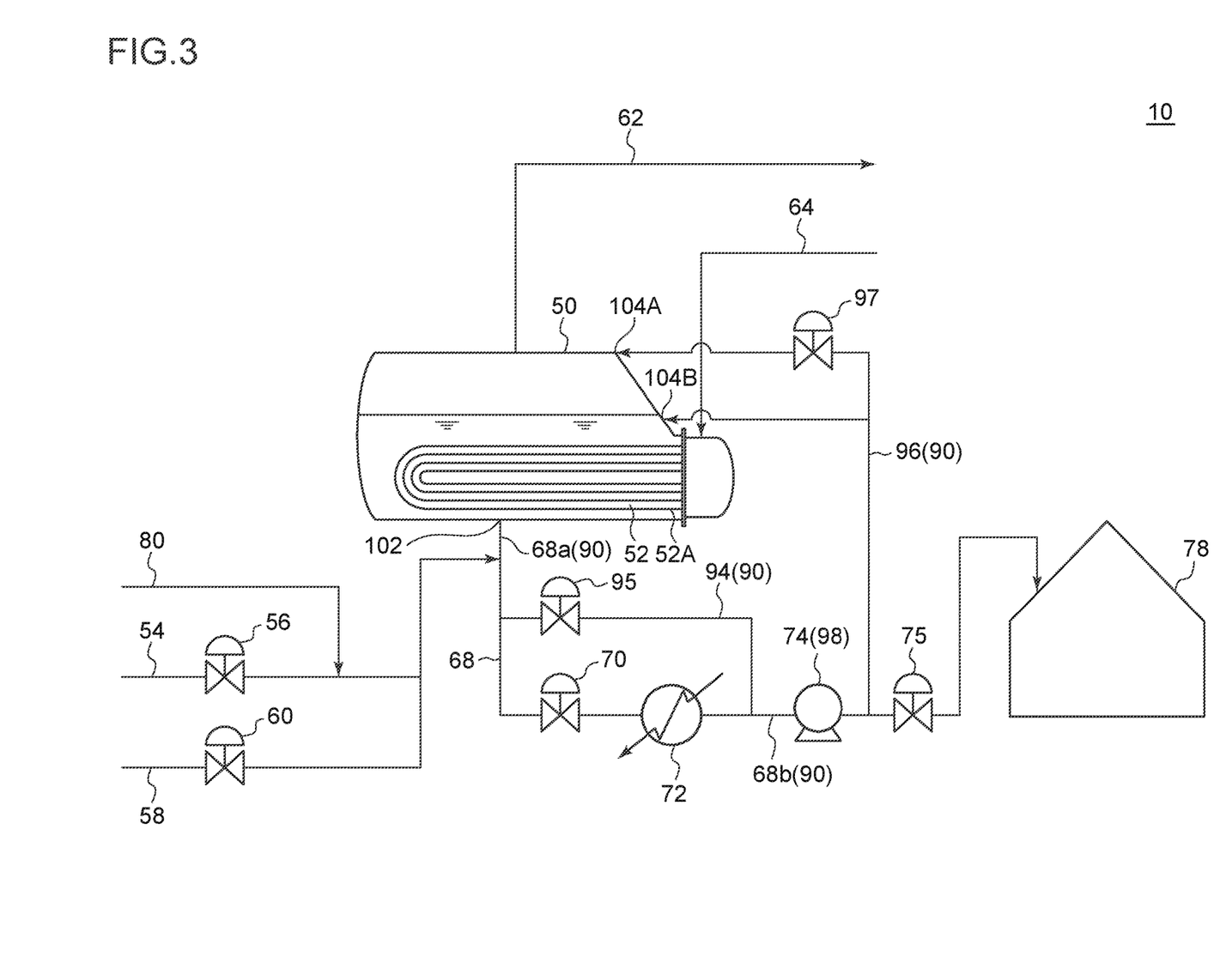
FIG. 3 is a schematic diagram of a reclaiming according to an embodiment.
Figure 4:
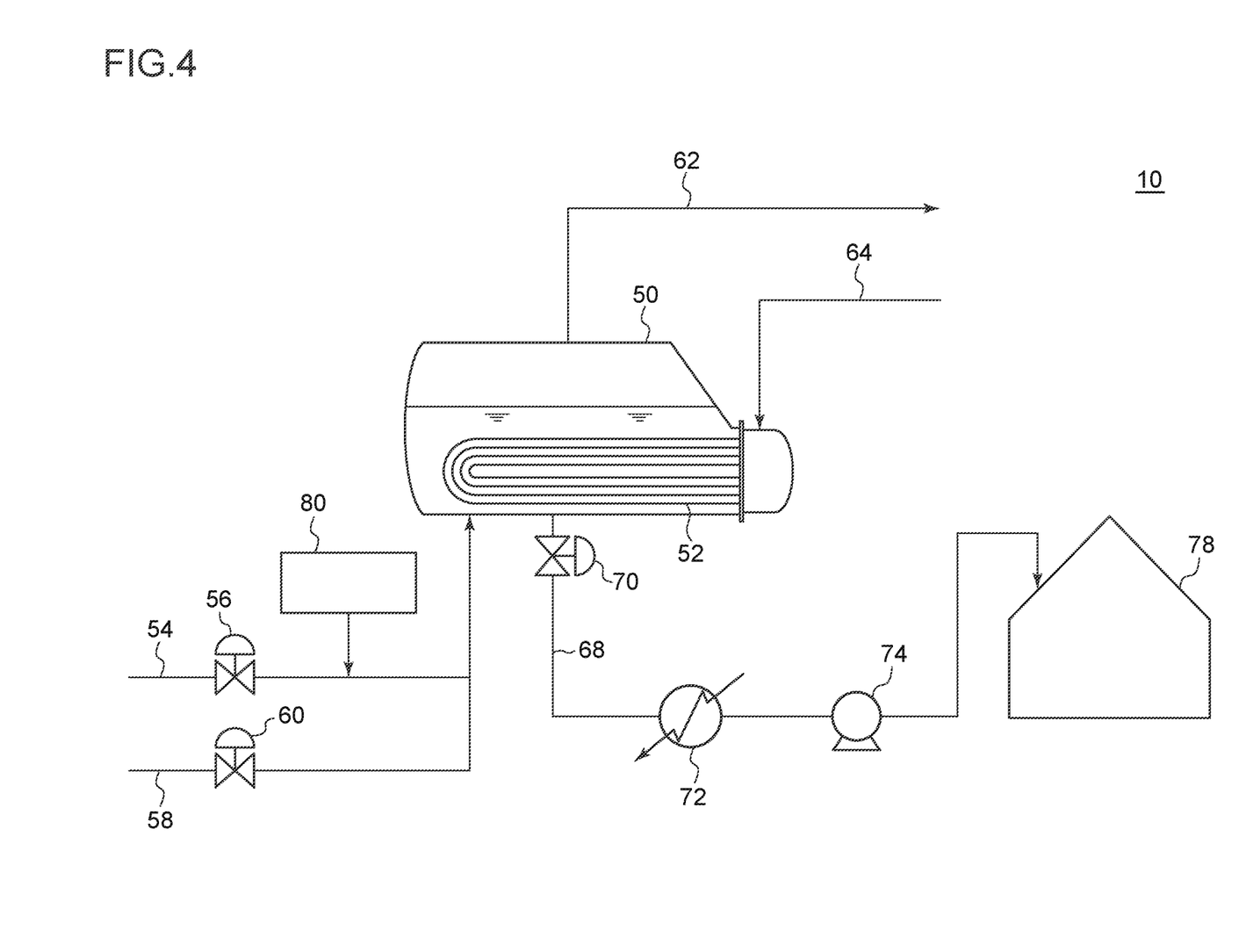
FIG. 4 is a schematic diagram of a reclaiming according to an embodiment.

The reclaiming apparatus 10 depicted in FIGS. 2 and 3 includes a circulation line 90, and a circulation pump 98 installed in the circulation line 90. The circulation line 90 is configured to extract a liquid in the container 50 and circulate the liquid to the top portion of the container 50. Furthermore, the absorption liquid supply line 54 is connected to the circulation line 90, and is configured to supply the absorption liquid to the circulation line 90.

In an illustrative embodiment depicted in FIG. 2, the circulation line 90 includes a circulation passage 92 including a first end 102 and second ends 104A, 104B connected to the container 50.

In the embodiment depicted in FIG. 2, the circulation line 90 includes a first end 102 connected to the bottom part of the container 50, and is configured to extract the liquid from the container 50 via the first end 102. Further, the circulation line 90 includes second ends 104A, 104B connected to the container 50, and is configured to return the liquid from the container 50 via the second ends 104A, 104B. Herein, the second end 104A is connected to the container 50 at the top portion of the container 50, and the liquid from the circulation line 90 flows into the gas-phase part inside the container 50 via the second end 104A. Further, the second end 104B is connected to the container 50 at a position above the lowest position 52A of the heating device 52, and at this position, the liquid from the circulation line 90 flows into the liquid-phase part inside the container 50.

In the present embodiment, by operating the circulation pump 98 while the above described absorption liquid regeneration step or the absorption liquid recovery step is performed in the reclaiming apparatus 10, it is possible to extract the liquid inside the container 50 while supplying the circulation line 90 with the absorption liquid and circulate the liquid and return the liquid to the container 50.

In an illustrative embodiment depicted in FIG. 3, the circulation line 90 includes a bypass line 94 having two ends connected to the waste liquid line 68, a waste-liquid line upstream portion 68a being a portion upstream of the bypass line 94, of the waste liquid line 68, a waste-liquid line downstream portion 68b being a portion downstream of the bypass line 94, of the waste liquid line 68, and a return line 96.

In the embodiment depicted in FIG. 3, the waste-liquid line upstream portion 68a (the circulation line 90) includes a first end 102 connected to the bottom part of the container 50, and is configured to extract the liquid from the container 50 via the first end 102. Further, the return line 96 (the circulation line 90) includes second ends 104A, 104B connected to the container 50, and is configured to return the liquid from the container 50 via the second ends 104A, 104B. Herein, the second end 104A is connected to the container 50 at the top portion of the container 50, and the liquid from the circulation line 90 flows into the gas-phase part inside the container 50 via the second end 104A. Further, the second end 104B is connected to the container 50 at a position above the lowest position 52A of the heating device 52, and at this position, the liquid from the circulation line 90 flows into the liquid-phase part inside the container 50.

The bypass line 94 is installed to bypass the waste liquid valve 70 and the waste liquid cooler 72 installed in the waste liquid line 68. Further, a valve 95 is installed in the bypass line 94.

A waste liquid pump 74 is installed in the waste-liquid line downstream portion 68b. The waste liquid pump 74 functions as the above described circulation pump 98.

The return line 96 includes an end connected to the waste liquid line 68 at the downstream of the waste liquid pump 74, and other ends connected to the container 50 (the above described second ends 104A, 104B). A valve 97 is installed in the return line 96.

Further, in the waste liquid line 68, a valve 75 for switching the flow of the waste liquid to the waste-liquid recovery tank 78 is installed at the downstream of the connection point of the return line 96.

Further, in the embodiment depicted in FIG. 3, the absorption liquid supply line 54 is connected to the waste-liquid line upstream portion 68a.

In the embodiment depicted in FIG. 3, while the above described absorption liquid regeneration step or the absorption liquid recovery step is performed in the reclaiming apparatus 10, in a state where the waste liquid valve 70 and the valve 75 installed in the waste liquid line 68 are closed, the valve 95 and the valve 97 installed in the circulation line 90 are opened, and the waste liquid pump 74 (circulation pump 98) is operated. Accordingly, while supplying the absorption liquid to the waste-liquid line upstream portion 68a (circulation line 90), it is possible to extract the liquid inside the container 50, circulate the liquid and return the liquid to the container 50, via the circulation line 90 including the waste-liquid line upstream portion 68a, the bypass line 94, the waste-liquid line downstream portion 68b, and the return line 96.

Further, in the embodiment depicted in FIG. 3, in the discharge step after ending the absorption liquid recovery step, the waste liquid valve 70 and the valve 75 installed in the waste liquid line 68 are opened after closing the valve 95 and the valve 97 installed in the circulation line 90 are closed, and the waste liquid pump 74 (circulation pump 98) is operated. Accordingly, the waste liquid containing reclaiming sludge remaining in the container 50 after completion of the above described absorption liquid recovery step is discharged from the container 50, and is sent to the waste-liquid recovery tank 78 via the waste liquid line 68.

In some embodiments, the reclaiming apparatus 10 further includes a bumping suppressing agent supply part 80 for adding a bumping suppressing agent to the absorption liquid or the liquid inside the container 50.

In an illustrative embodiment depicted in FIGS. 2 to 5, the bumping suppressing agent supply part 80 is configured to add a bumping suppressing agent to the absorption liquid supply line 54. Further, in FIGS. 2 to 5, the bumping suppressing agent supply part 80 is configured to inject a bumping suppressing agent into the absorption liquid supply line 54 at the upstream of a merge point to the water supply line 58. In another embodiment, the bumping suppressing agent supply part 80 may be configured to inject a bumping suppressing agent into the absorption liquid supply line 54 at the downstream of the merge point to the water supply line 58.

Figure 6:
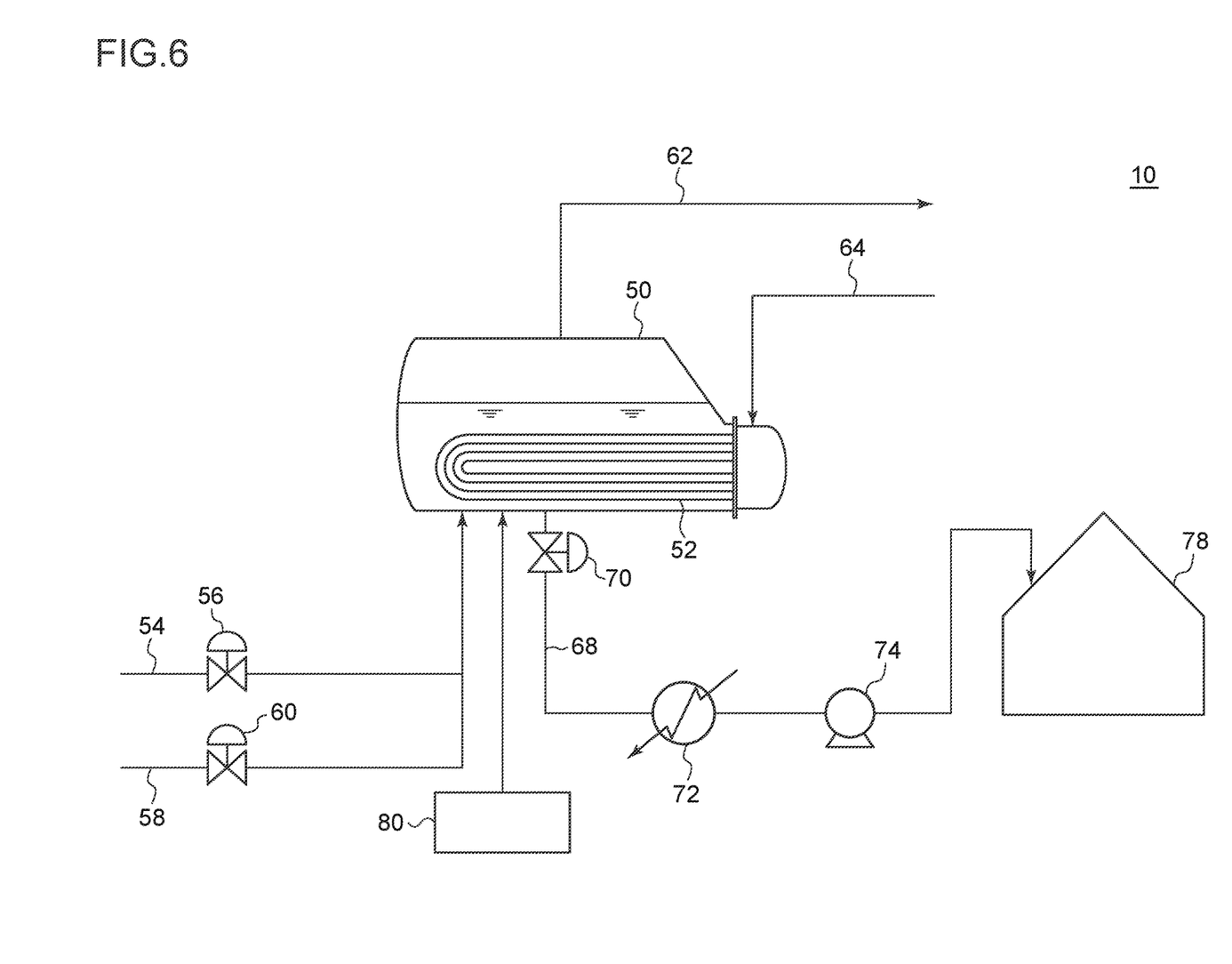
FIG. 6 is a schematic diagram of a reclaiming according to an embodiment.

In some embodiments, the bumping suppressing agent supply part 80 may be configured to add a bumping suppressing agent to the circulation line 90, or, as depicted in FIG. 6, configured to add a bumping suppressing agent directly to the container 50. In FIG. 6, the bumping suppressing agent supply part 80 is configured to add a bumping suppressing agent into the container 50 from the bottom part of the container 50.

As the above described bumping suppressing agent, for instance, gas containing inert gas such as nitrogen ($N_2$) and carbon dioxide ($CO_2$) may be used (e.g. nitrogen, air, carbon dioxide). By mixing such gas into the liquid inside the container 50, the gas forms bubble nuclei in the liquid inside the container 50, which promotes smooth boiling of the liquid. Accordingly, bumping inside the container is suppressed effectively.

Further, as a bumping suppressing agent, a rich liquid may be used, which has a high concentration of absorption target material than that of an absorption liquid supplied to a container via the absorption liquid supply line 54.

When a rich liquid having a high concentration of absorption target material (e.g. $CO_2$) is supplied to the liquid inside the container 50, a gas being an absorption target material may be produced in the container 50. In this case, the gas forms bubble nuclei, which promotes smooth boiling of the solvent in the container.

Thus, by using the above described rich liquid as a bumping suppressing agent, bubble nuclei of an absorption target material are formed in the liquid inside the container 50, which makes it possible to suppress bumping in reclaiming effectively.

Figure 5:
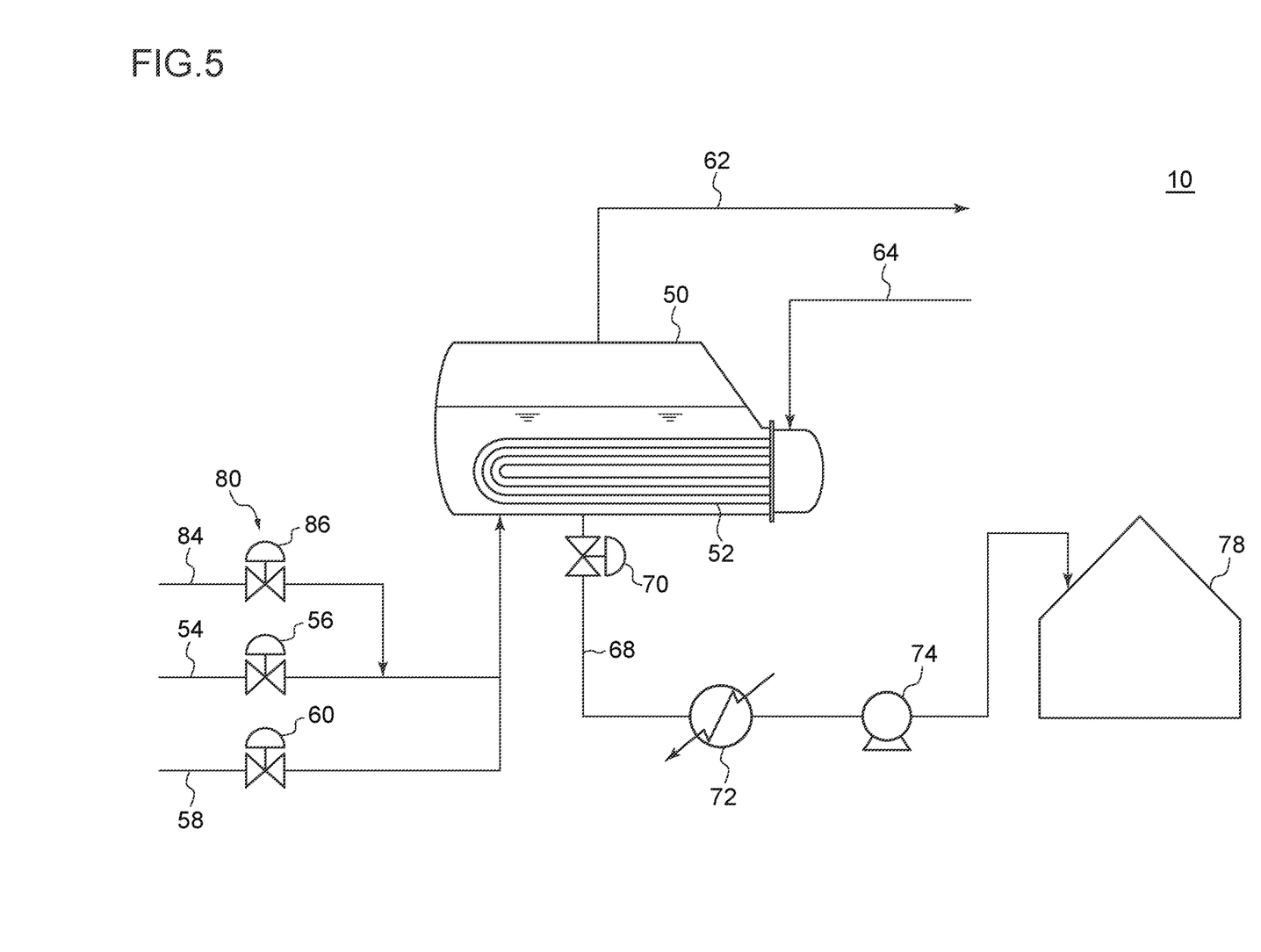
FIG. 5 is a schematic diagram of a reclaiming according to an embodiment.

For instance, in the embodiment depicted in FIG. 5, the bumping suppressing agent supply part 80 includes a rich liquid supply line 84 for injecting a rich liquid (bumping suppressing agent) into the absorption liquid supply line 54, and a rich liquid valve 86 for adjusting the supply amount of the rich liquid to the absorption liquid supply line 54 via the rich liquid supply line 84. By adjusting the rich liquid valve 86, it is possible to supply the absorption liquid supply line 54 with a predetermined amount of rich liquid.

In the embodiment depicted in FIGS. 1 and 5, as described above, at least a part of the lean absorption liquid 28 ($CO_2$ lean liquid) stored in the regeneration tower 4 of the $CO_2$ recovery apparatus 1 is supplied to the absorption liquid supply line as an absorption liquid, and at least a part of the rich absorption liquid 18 ($CO_2$ rich liquid) stored in the absorption tower 2 is supplied to the rich liquid supply line 84 (bumping suppressing agent supply part 80) as a bumping suppressing agent.

In FIG. 1, the lean absorption liquid ($CO_2$ rich liquid) is supplied to the absorption liquid supply line 84 from the rich liquid line 20 upstream of the heat exchanger 22.

Nevertheless, in another embodiment, the rich absorption liquid may be supplied to the rich liquid supply line 84 from the rich liquid line 20 downstream of the heat exchanger 22.

Further, the bumping suppressing agent supply part 80 in FIGS. 2 and 3 may be a bumping suppressing agent supply part 80 including the rich liquid supply line 84 and the rich liquid valve 86 similar to the embodiment depicted in FIG. 5, or a bumping suppressing agent supply part 80 of another embodiment.

With the reclaiming apparatus 10 according to some embodiments, the liquid inside the container is extracted via the circulation line, and the liquid is circulated to return to the container. Thus, it is possible to suppress bumping that may occur due to condensation or the like of the depleted materials in the container as the reclaiming proceeds.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

DESCRIPTION OF REFERENCE NUMERALS

2 Absorption tower
4 Regeneration tower
6 Reflux water drum
10 Reclaiming apparatus
12 Exhaust gas introduction line
14 Absorption part
16 Tower top part
18 Rich absorption liquid
20 Rich liquid line
22 Heat exchanger
24 Release part
26 Cleaning device
28 Lean absorption liquid
30 Re-boiler line
32 Regeneration heater
36 Lean liquid line
38 Cooler
40 CO2 gas line
42 Condenser
44 Condensed water
46 Reflux water line
48 Recovery line
50 Container
52 Heating device
52A Lowest position
54 Absorption liquid supply line
56 Absorption liquid valve
58 Water supply line
60 Water valve
62 Steam discharge line
68 Waste liquid line
68a Waste-liquid line upstream portion
68b Waste-liquid line downstream portion
70 Waste liquid valve
72 Waste liquid cooler
74 Waste liquid pump
75 Valve
78 Waste-liquid recovery tank
80 Bumping suppressing agent supply part
84 Rich liquid supply line
86 Rich liquid valve
90 Circulation line
92 Circulation passage
94 Bypass line
95 Valve
96 Return line
97 Valve
98 Circulation pump
102 First end
104A, 104B Second end

The invention claimed is:
1. A reclaiming apparatus, comprising:
a container in which a reclaiming process of an absorption liquid is performed;
an absorption liquid supply line for supplying the container with the absorption liquid;
a heat exchange device, installed inside the container, for heating a liquid inside the container;
a circulation line for extracting the liquid inside the container, circulating the liquid and returning the liquid to the container; and
a circulation pump installed in the circulation line, wherein
the absorption liquid supply line is connected to the circulation line and supplies the circulation line with the absorption liquid.

2. The reclaiming apparatus according to claim 1,
wherein the circulation line includes a first end connected to a bottom part of the container, and is configured to extract the liquid from the container via the first end.

3. The reclaiming apparatus according to claim 1,
wherein the circulation line includes a second end connected to the container, and is configured to return the liquid to the container via the second end, and
wherein the second end is connected to a gas-phase part of the container.

4. The reclaiming apparatus according to claim 1,
wherein the circulation line includes a second end connected to the container, and is configured to return the liquid to the container via the second end,
wherein the second end is connected to a liquid-phase part inside the container above the bottom of the heat exchange device.

5. The reclaiming apparatus according to claim 1, further comprising:
a waste-liquid recovery tank for storing a waste liquid from the container;
a waste liquid line installed between the container and the waste-liquid recovery tank; and
a waste liquid pump, installed in the waste liquid line, for sending the waste liquid from the container to the waste-liquid recovery tank,
wherein the circulation line is formed to pass through the waste liquid pump, and
wherein the waste liquid pump is configured to function as the circulation pump.

6. The reclaiming apparatus according to claim 1,
further comprising a bumping suppressing agent supply device for adding a bumping suppressing agent to the absorption liquid supply line or the circulation line.

7. The reclaiming apparatus according to claim 6,
wherein the bumping suppressing agent contains a rich liquid having a higher concentration of an absorption target material than the absorption liquid.

8. A CO2 recovery apparatus, comprising:
an absorption tower configured to cause an absorption liquid containing an absorption agent to absorb CO2 in exhaust gas;
a regeneration tower for regenerating the absorption liquid from the absorption tower; and
the reclaiming apparatus according to claim 1,
wherein the CO2 recovery apparatus is configured such that at least a part of the absorption liquid stored in the regeneration tower is supplied to the container via the absorption liquid supply line.

9. The CO2 recovery apparatus according to claim 8,
wherein the reclaiming apparatus includes a bumping suppressing agent supply part for adding a bumping suppressing agent to the absorption liquid supply line or the circulation line,
wherein the bumping suppressing agent is a rich liquid having a higher concentration of an absorption target material than the absorption liquid,
wherein the CO2 recovery apparatus is configured such that at least a part of a CO2 lean liquid stored in the regeneration tower is supplied to absorption liquid supply line as the absorption liquid, and
wherein the CO2 recovery apparatus is configured such that at least a part of a CO2 rich liquid stored in the absorption tower is supplied to the bumping suppressing agent supply part as the bumping suppressing agent.

10. A reclaiming method, comprising:
a step of supplying a container including a heat exchange device inside with an absorption liquid via an absorption liquid supply line;
a step of performing a reclaiming process by heating a liquid inside the container containing the absorption liquid with the heat exchange device;
a step of extracting the liquid inside the container to a circulation line; and
a step of returning the liquid extracted to the circulation line to the container, by circulating the liquid with a circulation pump installed in the circulation line, wherein
the absorption liquid supply line is connected to the circulation line, and
the step of supplying the absorption liquid includes supplying the container with the absorption liquid via the circulation line.

11. The reclaiming method according to claim 10,
further comprising a step of adding a bumping suppressing agent to the absorption agent supply line or the circulation line.

12. A CO2 recovery method, comprising:
a step of causing an absorption liquid containing an absorption agent to absorb CO2 in exhaust gas, in an absorption tower;
a step of supplying the absorption liquid from the absorption tower to a regeneration tower, and regenerating the absorption liquid from the absorption tower in the regeneration tower; and
a step of performing the reclaiming method according to claim 10,
wherein the step of supplying the container with the absorption liquid includes supplying the container with at least a part of the absorption liquid stored in the regeneration tower.

13. A reclaiming apparatus, comprising:
a container in which a reclaiming process of an absorption liquid is performed;
an absorption liquid supply line for supplying the container with the absorption liquid;
a heat exchange device, installed inside the container, for heating a liquid inside the container which contains the absorption liquid; and
a bumping suppressing agent supply device for adding a bumping suppressing agent into the container from a bottom part of the container via a bumping suppressing agent supply line connected to the bottom part,
wherein the bumping suppressing agent contains a rich liquid having a higher concentration of an absorption target material than the absorption liquid.

* * * * *